United States Patent
Lawrence (10) Patent No.: US 7,897,895 B2
(45) Date of Patent: Mar. 1, 2011

(54) SYSTEM AND METHOD FOR CONTROLLING THE POWER LEVEL OF A LASER APPARATUS IN A LASER SHOCK PEENING PROCESS

(75) Inventor: Wayne Lawrence, Sardinia, OH (US)

(73) Assignee: General Electric Company, Schenectady, NY (US)

( * ) Notice: Subject to any disclaimer, the term of this patent is extended or adjusted under 35 U.S.C. 154(b) by 677 days.

(21) Appl. No.: 11/380,969

(22) Filed: May 1, 2006

(65) Prior Publication Data
US 2009/0120914 A1   May 14, 2009

(51) Int. Cl.
B23K 26/00 (2006.01)
H01S 3/00 (2006.01)

(52) U.S. Cl. ............. 219/121.85; 372/29.012; 372/38.03

(58) Field of Classification Search ............. 372/29.012, 372/29.015, 29.011, 38.02, 38.03; 219/121.6, 219/121.85, 121.61, 121.62; 323/233, 352, 323/353, 364
See application file for complete search history.

(56) References Cited

U.S. PATENT DOCUMENTS

| | | | |
|---|---|---|---|
| 3,443,206 A * | 5/1969 | Bradley | 323/233 |
| 3,490,031 A * | 1/1970 | Marcus et al. | 323/233 |
| 3,546,573 A * | 12/1970 | Coccia | 323/299 |
| 3,758,824 A * | 9/1973 | Warneke | 315/246 |
| 3,806,829 A * | 4/1974 | Duston et al. | 219/121.61 |
| 4,517,436 A | 5/1985 | Lawrence | |
| 4,601,037 A | 7/1986 | McDonald | |
| 5,327,167 A * | 7/1994 | Pollard et al. | 219/121.68 |
| 5,408,483 A * | 4/1995 | Kasai et al. | 372/38.02 |
| 5,689,330 A | 11/1997 | Gerard et al. | |
| 5,730,811 A | 3/1998 | Azad et al. | |
| 5,936,986 A | 8/1999 | Cantatore et al. | |
| 5,966,394 A * | 10/1999 | Spurr et al. | 372/29.015 |
| 5,980,101 A * | 11/1999 | Unternahrer et al. | 374/32 |
| 5,987,042 A * | 11/1999 | Staver et al. | 372/30 |
| 6,151,345 A | 11/2000 | Gray | |
| 6,278,476 B1* | 8/2001 | Ueno | 347/247 |
| 6,297,664 B1* | 10/2001 | Galli | 326/30 |
| 6,462,825 B1 | 10/2002 | Wiebesick | |
| 6,479,790 B1 | 11/2002 | Graham et al. | |
| 6,512,584 B1* | 1/2003 | O'Loughlin et al. | 427/554 |
| 6,700,916 B1 | 3/2004 | Kramer et al. | |
| 6,711,189 B1 | 3/2004 | Gilliland et al. | |
| 7,180,918 B2* | 2/2007 | Dane et al. | 372/12 |
| 2001/0042738 A1* | 11/2001 | Dulaney | 219/121.77 |
| 2004/0238509 A1 | 12/2004 | Clauer et al. | |

(Continued)

FOREIGN PATENT DOCUMENTS

EP   1122321 A   8/2001

(Continued)

*Primary Examiner* — Geoffrey S Evans
(74) *Attorney, Agent, or Firm* — McNees Wallace & Nurick LLC (57) ABSTRACT

An on-the-fly analog switching method and system for providing a switching time of less than one second between energy levels and laser heads for laser shock peening applications. An analog switch is used with variable resistance devices that produce a switching time of less than one second. One advantage of the present invention is that a switching time of less than one second is provided which provides for an energy and time efficient system. The laser shock peening process is never delayed for switching purposes as the switching occurs during the standard pause between treated linear areas.

18 Claims, 6 Drawing Sheets

U.S. PATENT DOCUMENTS

| | | |
|---|---|---|
| 2004/0262277 A1 | 12/2004 | Mika et al. |
| 2005/0040149 A1* | 2/2005 | Rockstroh ............... 219/121.73 |
| 2005/0045607 A1 | 3/2005 | Tenaglia et al. |
| 2005/0092724 A1 | 5/2005 | Warren, Jr. et al. |
| 2006/0249490 A1* | 11/2006 | Renaud ................... 219/121.68 |

FOREIGN PATENT DOCUMENTS

| | | |
|---|---|---|
| WO | 03/058827 A2 | 7/2003 |

* cited by examiner

SYSTEM AND METHOD FOR CONTROLLING THE POWER LEVEL OF A LASER APPARATUS IN A LASER SHOCK PEENING PROCESS

BACKGROUND OF THE INVENTION

The present invention relates generally to laser shock peening and, more particularly, to a method and system for on the fly analog switching on the fly of laser energy levels during the laser shock peening process.

Laser shock peening or laser shock processing as it is also referred to, is a process for producing a region of deep compressive residual stresses in a surface area of an article. Laser shock peening typically uses one or more radiation pulses from high energy, i.e., 1 to 50 joules of energy or more, pulsed laser beams to produce an intense shockwave at the surface of an article. Exemplary methods of LSP are disclosed in U.S. Pat. No. 3,850,698 entitled "Altering Material Properties"; U.S. Pat. No. 4,401,477 entitled "Laser Shock Processing"; and U.S. Pat. No. 5,131,957 entitled "Material Properties." Further, the use of lower energy laser beams in LSP is disclosed in U.S. Pat. No. 5,932,120 entitled "Laser Shock Peening Using Low Energy Laser." Laser shock peening, as understood in the art and as used herein, means utilizing a pulsed laser beam from a laser beam source to produce a strong localized compressive force on a portion of a surface by producing an explosive force at the impingement point of the laser beam by an instantaneous ablation or vaporization of a thin layer of that surface or of a coating (such as tape or paint) on that surface which forms a plasma.

Laser shock peening is being developed for many applications in the gas turbine engine field, some of which are disclosed in the following: U.S. Pat. No. 5,756,965 entitled "On The Fly Laser Shock Peening"; U.S. Pat. No. 5,591,009 entitled "Laser Shock Peened Gas Turbine Engine Fan Blade Edges"; U.S. Pat. No. 5,531,570 entitled "Distortion Control For Laser Shock Peened Gas Turbine Engine Compressor Blade Edges"; U.S. Pat. No. 5,492,447 entitled "Laser Shock Peened Rotor Components For Turbomachinery"; U.S. Pat. No. 5,674,329 entitled "Adhesive Tape Covered Laser Shock Peening"; and U.S. Pat. No. 5,674,328 entitled "Dry Tape Covered Laser Shock Peening."

Laser shock peening has been utilized to create a compressively stressed protective layer at the outer surface of an article which is known to considerably increase the resistance of the article to fatigue failure as disclosed in U.S. Pat. No. 4,937,421 entitled "Laser Peening System and Method". These methods typically employ a curtain of water flowed over the article or some other method to provide a plasma confining medium. This medium enables the plasma to rapidly achieve shockwave pressures that produce the plastic deformation and associated residual stress patterns that constitute the laser shock peening effect. The curtain of water provides a confining medium, to confine and redirect the process generated shockwaves into the bulk of the material of a component being laser shock peened, to create the beneficial compressive residual stresses.

The pressure pulse from the rapidly expanding plasma imparts a traveling shockwave into the component. This compressive shockwave initiated by the laser pulse results in deep plastic compressive strains in the component. These plastic strains produce residual stresses consistent with the dynamic modulus of the material. The many useful benefits of laser shock peened residual comprehensive stresses in engineered components have been well documented and patented, including the improvement on fatigue capability. These comprehensive residual stresses are balanced by the residual tensile stresses in the component. The added residual tensile stresses may locally lower the fatigue capability of components and thus, should be reduced and/or minimized.

Laser shock peening is performed at selective locations on the component to solve a specific problem. The balancing tensile stresses usually occur at the edge of the laser shock peened area. Small narrow bands or lines of tensile stresses can build up immediately next to the laser shock peened patch area along the edges of the patch. Extensive finite element analyses are done to determine where these tensile stresses will reside and the LSP patches are designed and dimensioned such that the tensile band(s) end up in an inert portion of the article or component (i.e., not at a high stress line in one of the flex, twist or other vibratory modes). It is desirable to reduce the level of these tensile stresses in the transitions area between the laser shock peened and non-laser shock peened areas.

During the laser peening process, the laser head moves in linear movements across the treated area. The time delay between each linear space is approximately one second. Most applications using laser shock peening require different energy levels and laser heads for select areas that are being laser shock peened. One energy level will be used for several linear areas, and then a switch must be made to another energy level or another laser head for the next linear area. Since the delay time between linear areas is approximately one second, the switch between laser heads or energy levels should be made within that one-second delay to ensure optimal energy use and the most efficient system. In the past, digital switches were used to facilitate the switching, but the timing for these digital switches were greater than one second, resulting in an energy and time loss during the switching delay for the energy level and laser head switching.

Therefore, there is a need for a switching mechanism that can provide a switching time of less than one second so the changing of energy levels and laser heads can be accomplished during the delay between linear areas.

SUMMARY OF THE INVENTION

One embodiment of the present invention is directed to a method for controlling a laser apparatus in a laser shock peening process, where the method includes the steps of providing a laser apparatus configured to perform a laser shock peening process, where the laser apparatus has a first circuit with a first impedance, and the first circuit is configured to provide a first energy level. The next step includes connecting a second circuit to the first circuit, where the second circuit comprises a second impedance and a switching arrangement, the switching arrangement is configured to connect the second impedance to the first circuit to provide a second energy level or to isolate the second impedance from the first circuit. The next step includes controlling the switching arrangement to isolate the second impedance, wherein the switching arrangement isolates the second impedance in less than one second. Next, the method includes the step of operating the laser apparatus at the first energy level in response to the second impedance being isolated by the switching arrangement, controlling the switching arrangement to connect the second impedance, wherein the switching arrangement connects the second impedance in less than one second, and operating the laser apparatus at the second energy level in response to the second impedance being connected.

Another embodiment of the present invention is directed to a system for controlling a power level in a laser head of a laser apparatus used with a laser shock peening process, the system comprising a first circuit having a first impedance, the first circuit being configured to generate a first output power level in the laser apparatus, a second power circuit having a second impedance, a switching device that is configured and disposed to connect and disconnect the second circuit from the first circuit, wherein the switching device connects the second circuit to the first circuit in less than one second and disconnects the second circuit from the first circuit in less than one second, and wherein the connection of the second circuit to the first circuit generates a second output power level from the laser apparatus.

Yet another embodiment of the present invention is directed to a system for controlling a power level in a laser head of a laser apparatus used with a laser shock peening process, the system comprising a laser control computer that is configured to generate a signal to trigger the laser head, a digital delay generator that is configured to receive the trigger signal from the laser control computer, and to incorporate a predetermined delay into the trigger signal to generate a delayed trigger signal, a laser pulse forming network charger configured to receive the delayed trigger signal and provide a firing signal to the laser head to initiate operation of the laser head, and a control arrangement that is configured to provide the predetermined delay to the digital delay generator, wherein the predetermined delay being used to control an output power level of the laser head.

One advantage of the present invention is the reduced switching time provided by the analog switch. The analog switch provides a maximum switching time of less than one second, allowing the laser heads or energy levels to switch during the natural pauses in the laser shock peening process without causing unwanted delay.

Another advantage of the present invention is the energy saved during the process because of the switching time of less than one second. The system does not have to wait for the switching to occur between linear areas being treated, therefore the system is continually operating, without any idling.

Yet another advantage of the present invention is the efficiency of the system. Since the switching time is less than one second, the system is continually operating, without any wasted time or energy, thereby creating an optimally efficient system.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
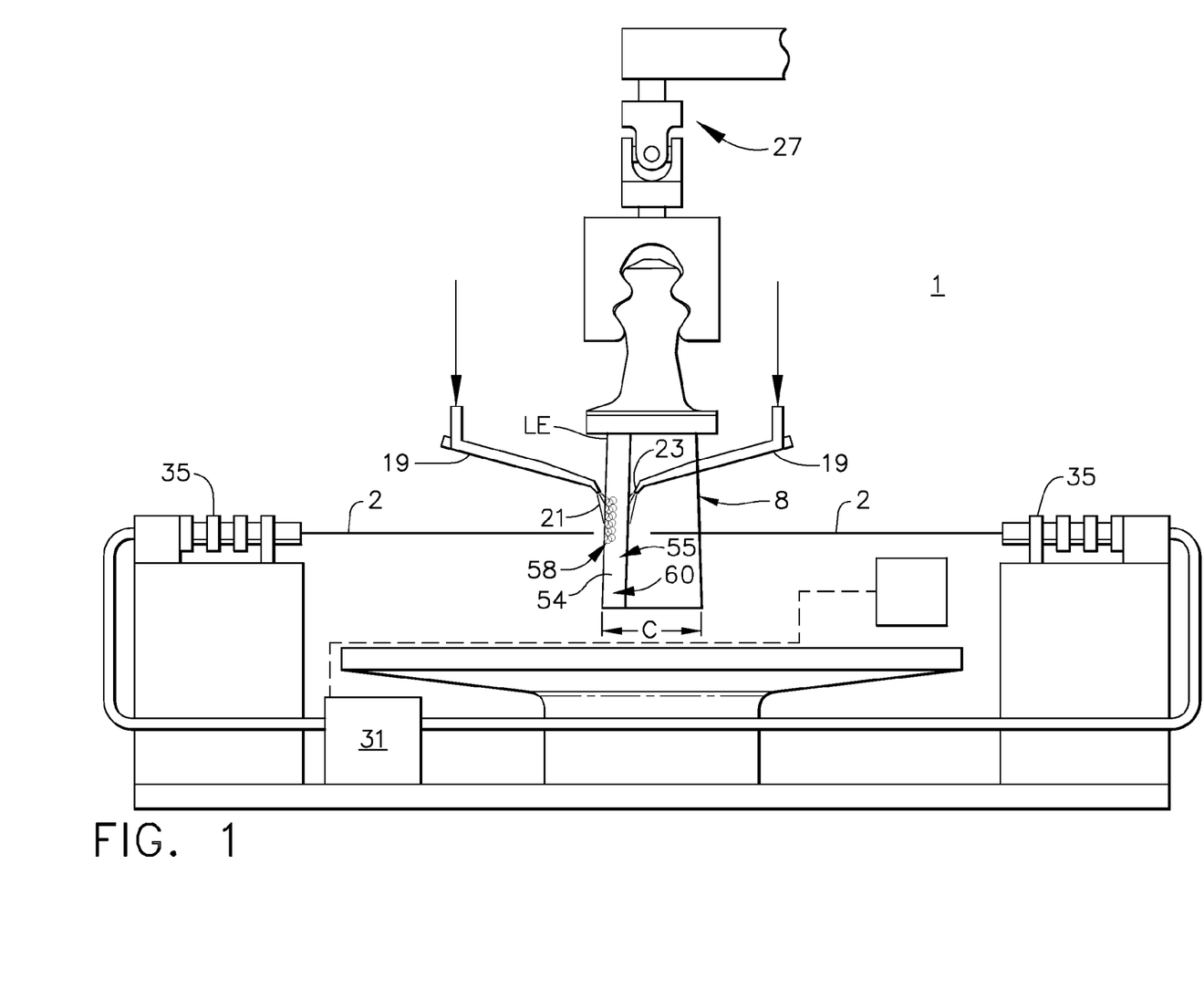
FIG. 1 is an illustration of a laser shock peening system that can be used with the present invention.
Figure 2:
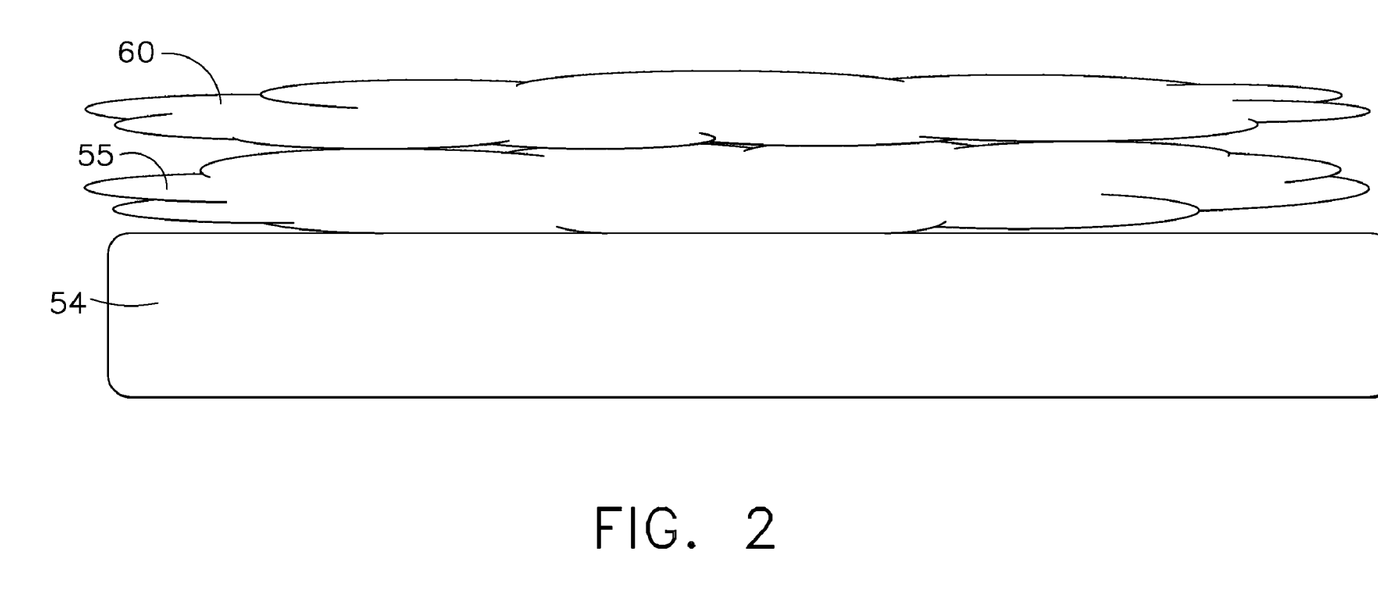
FIG. 2 is an illustration of water and paint layers on surface for laser shock peening.

Referring to FIG. 1, laser shock peening involves firing two high energy laser beams 2, each of which are defocused ±a few mils with respect to the surfaces 54 on both sides of the leading edge (LE) of a surface 54 which is covered with a layer of paint 55 and a layer of water 60. Shown in FIG. 2, the paint layer 55 acts as an absorbent layer, while the water layer 60 is a transparent layer that acts as a confinement medium. A surface plasma results when the laser pulse from the laser beams 2 interacts with the thin absorbent overlay of the paint layer 55 and water layer 60. As the plasma expands, a shock wave is driven into the surface 54. The water transparent layer 60 increases the strength of the shock wave significantly because the layer is transparent to the laser radiation. Referring again to FIG. 1, the laser beam 2 typically has a peak power density on the order of magnitude of a gigawatt/cm$^2$ and is fired through the water transparent layer 60, which is preferably a curtain of flowing water 21. The paint is ablated, generating plasma, which results in shock waves on the surface 54 of the material. These shock waves are re-directed towards the painted surface 54 by the curtain of flowing water 21 to generate traveling shock waves (pressure waves) in the material surface 54 below the paint layer 55. The amplitude and quantity of these shockwaves determine the depth and intensity of compressive stresses in the surface material 37.

FIG. 1 shows an apparatus 1 which has the surface material 54 to be treated mounted in a conventional robotic arm 27 used to continuously move and position the surface material 54 to provide laser shock peening "on the fly" in accordance with one embodiment of the present invention. The laser shock peened surfaces 54 of the leading edge (LE) are painted with an ablative paint layer 55. Then, the surface material 54 is continuously moved while continuously firing the stationary laser beams 2 through a curtain of flowing water 21 on the surfaces 54 and forming overlapping laser shock peened circular spots 58. The curtain of water 21 is illustrated as being supplied by a conventional water nozzle 23 at the end of a conventional water supply tube 19. The laser shock peening apparatus 1 has a conventional generator 31 with an oscillator, a pre-amplifier and a beam splitter which feeds the pre-amplified laser beam 2 into two beam optical transmission circuits each having a first and a second amplifier and optics 35 which include optical elements that transmit and focus the laser beam 2 on the laser shock peened surfaces 54 in a controlled manner. The ablated paint material is washed out by the curtain of flowing water 21.

Figure 3:
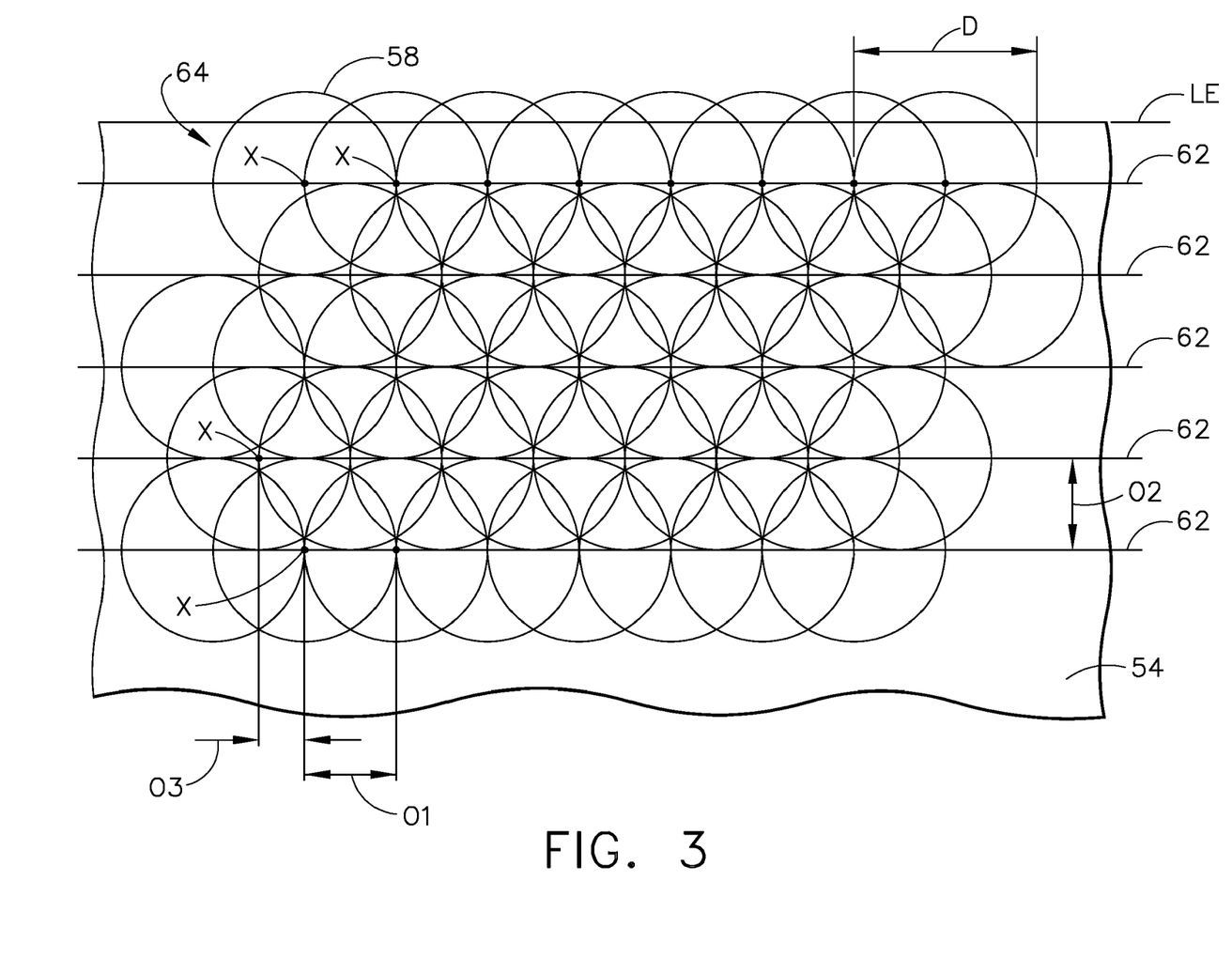
FIG. 3 is an illustration of a pattern of laser shock peened circular spots on a laser shock peened surface along a surface.
Figure 4:
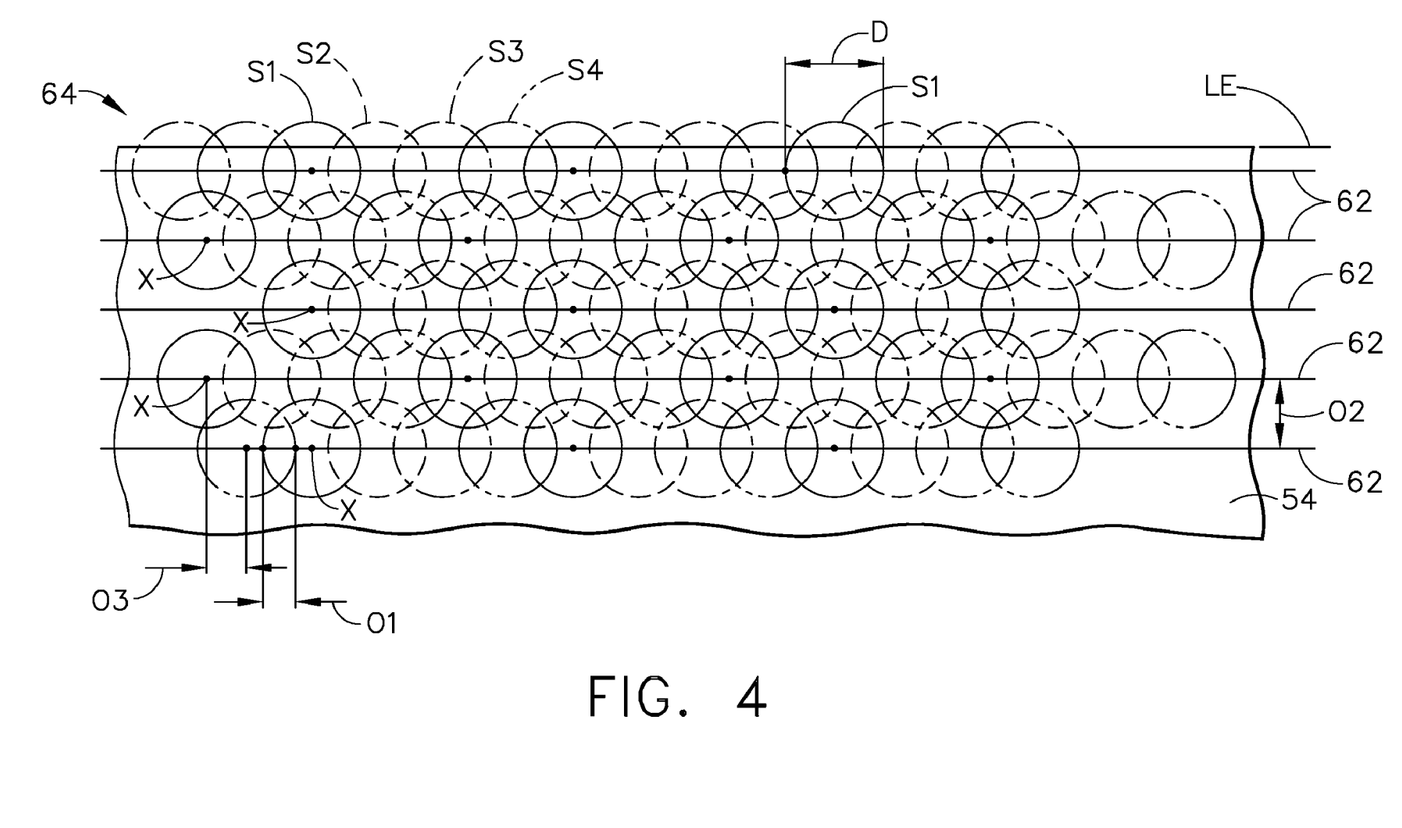
FIG. 4 is an illustration of a particular pattern having four sequences of laser shocked peened circular spots that don't overlap within a given sequence.

Referring to FIG. 3, the laser may be rapidly fired sequentially, or "on the fly", so that the laser shock peened surface 54 is laser shock peened with more than one sequence of painting the surface and then continuously moving the surface material 54 while continuously firing the laser beam 2 on the surface 54 such that adjacent laser shock peened circular spots 58 are hit in different sequences. The laser shock peened surface has a leading edge (LE), which is treated by the laser beam 2. FIGS. 3 and 4 illustrate a pattern of laser shocked peened circular spots 58 (indicated by the circles) of four such sequences S1 through S4. In FIG. 4, the S1 sequence is shown as full line circles, as opposed to dotted line circles of the other sequences, to illustrate the feature of having non adjacent laser shocked peened circular spots 58 with their corresponding centers X along a row centerline 62. The pattern of sequences entirely covers the laser shock peened surface 54. The laser shocked peened circular spots 58 have a diameter D in a row 64 of overlapping laser shock peened circular spots 58. The pattern may be of multiple overlapping rows 64 of overlapping shock peened circular spots 58 on the laser shock peened surfaces 54. A first overlap is between adjacent laser shock peened circular spots 58 in a given row and is generally defined by a first offset O1 between centers X of the adjacent laser shock peened circular spots 58 and can vary from about 30%-50% or more of the diameter D. A second overlap is between adjacent laser shock peened circular spots 58 in adjacent rows and is generally defined by a second offset O2 between adjacent row centerlines 62 and can vary from about 30%-50% of the diameter D depending on applications and the strength or fluency of the laser beam. A third overlap in the form of a linear offset O3 between centers X of adjacent laser shock peened circular spots 58 in adjacent rows 64 and can vary from about 30%-50% of the diameter D depending on a particular application.

Referring to FIG. 4, several sequences may be required to cover the entire pattern and re-painting of the laser shock peened surfaces 54 is done between each sequence of laser firings. The laser firing for each sequence has multiple laser firings or pulses with a period between firings that is often referred to a "rep". During the rep the part is moved so that the next pulse occurs at the location of the next laser shocked peened circular spot 58. Preferably the part is moved continuously and timed to be at the appropriate location at the pulse or firing of the laser beam. One or more reps of each sequence may be used to hit each laser shocked peened circular spot 58 more than once. In cases where the material surface is relatively thin (e.g. 0.040" or less), laser energy changes may be required during the processing of an area covered by a LSP patch. The present invention enables the laser 2 to switch between necessary laser heads and energy levels for the different sequences of firings. The laser shock peening process has a less than one second delay during laser head switching.

Figure 5:
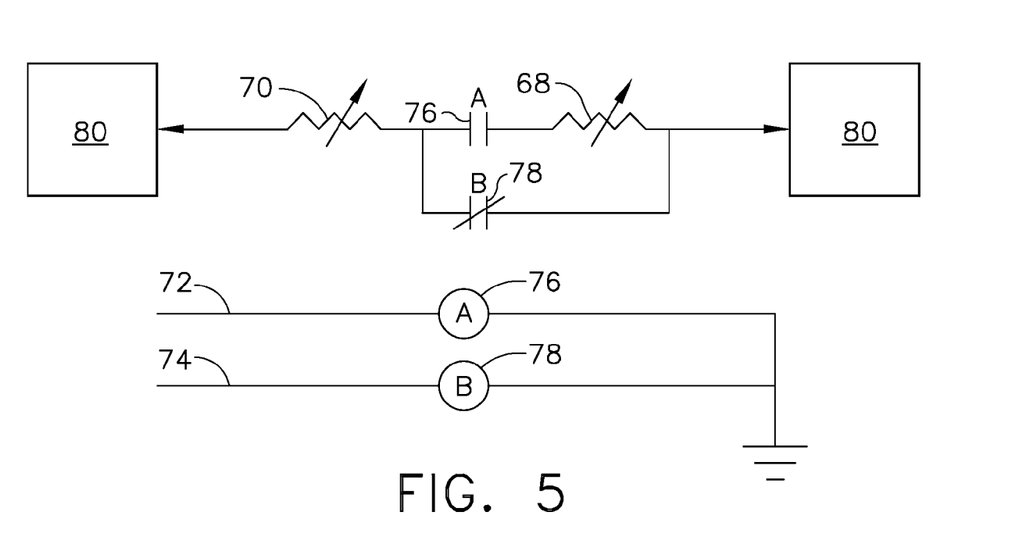
FIG. 5 is a schematic diagram of the first analog switching method.

Referring now to FIG. 5, one embodiment of the present invention is an analog circuit that allows the change of laser energy levels in less than one second. The short switching time is accomplished by having an analog circuit connected to receive voltage from the laser pulse forming network control card 80 and to return a voltage to the laser pulse forming network control card 80 after passing through the impedance circuit. The analog circuit operates by having an external impedance or resistance 68 in series with an existing impedance or resistance 70 located on the laser. In addition, if more than two energy levels are required for a laser head, an additional external impedance or resistance configured for the desired energy level and corresponding control relay are connected in parallel to the external impedance or resistance 68 and it's corresponding control relay. In a preferred embodiment, the different energy levels are obtained by switching external resistors in series with current resistors located on the laser control. The resistor in series with the current resistor located on the laser control changes the voltage levels that reach the laser head and thereby control the energy level of the laser for the laser shock peening application. Two control outputs 72, 74 are included in the circuit, one for each control relay 76, 78. The first relay 76 must be energized before the second relay 78 is energized to prevent the pulse forming network (PFN) control from seeing an open circuit. A temporary open circuit occurrence can result in an error from the laser and an error in the laser peening system.

Figure 6:
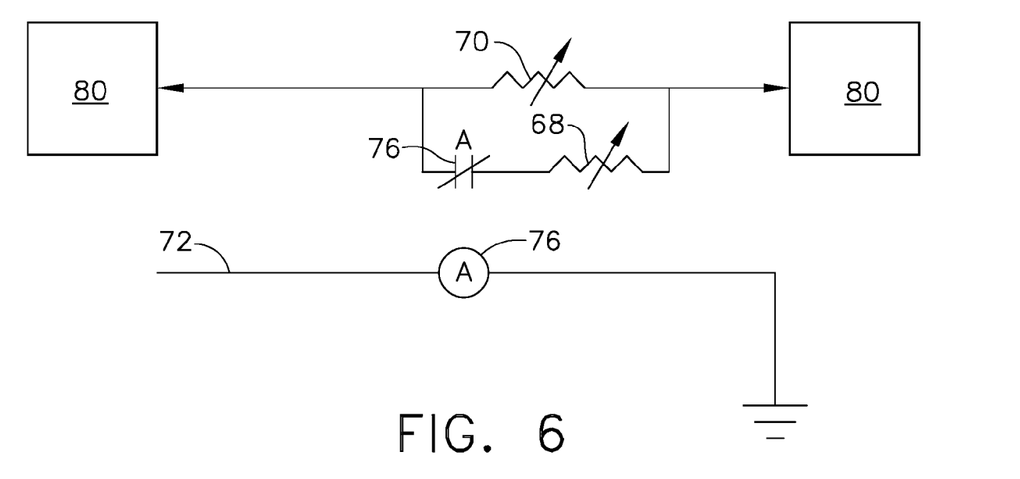
FIG. 6 is a schematic diagram of the second analog switching method.

Referring now to FIG. 6, the present invention also includes an analog controller or circuit configured in a second schematic formation. This circuit also allows the change of laser energy levels in less than one second. This less than one second switching occurs during the period where the laser is already delayed when moving to the next section or row on the surface to laser shock peen between reps. An external impedance or resistance 68 and corresponding control relay are placed in parallel with the existing impedance or resistance 70 located on the laser control device. The external resistor in parallel with the current resistor located on the laser control changes the voltage levels that reach the laser head and thereby control the energy level of the laser for the laser shock peening application. This analog circuit is also duplicated for each laser head that is controlled in the system. In addition, if more than two energy levels are required for a laser head, an additional external impedance or resistance configured for the desired energy level and it's corresponding control relay are connected in parallel to external impedance or resistance 68. The benefit of this configuration is that only one control output 72 is needed to prevent the PFN control card from seeing an open circuit across the one necessary relay 76 device. CNC control or robot control can be used with this circuit, and other devices such as capacitors may be connected in the circuit as well (e.g., for use with an RC time constant circuit).

Figure 7:
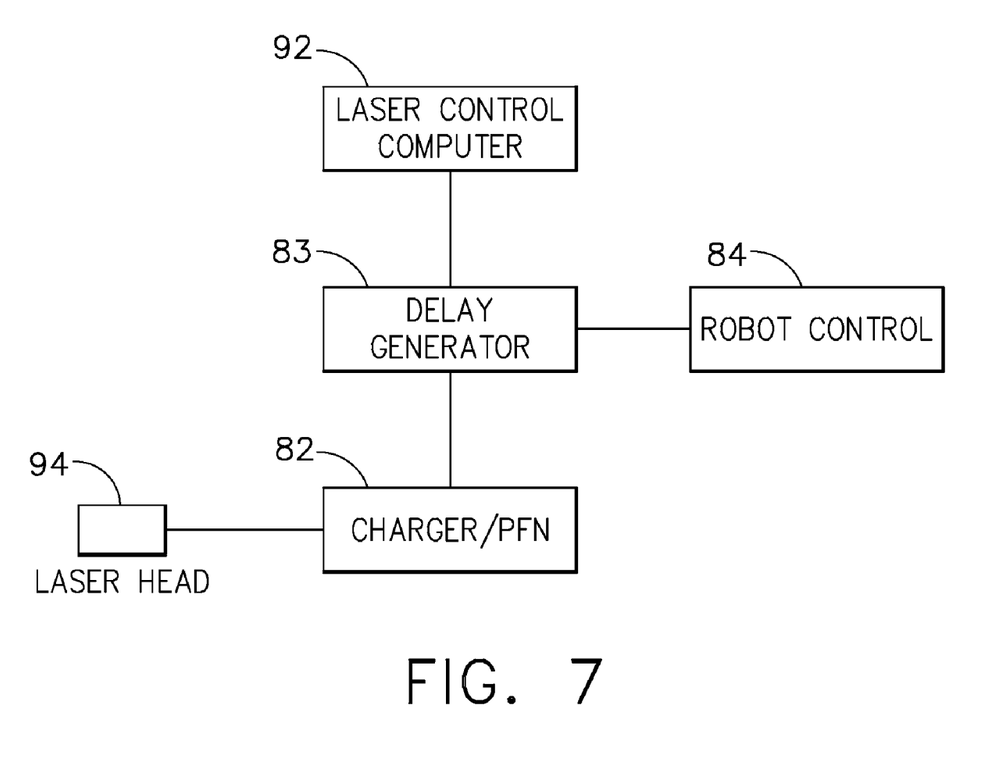
FIG. 7 is a schematic diagram of the digital switching method.

Referring now to FIG. 7, the present invention also includes a digital controller for controlling the output power level to the laser head 94 to change the energy level of the laser. The digital controller switches on an external delay generator 83 located between the Laser Control Computer 92 and the charging/Pulse Forming Network 82. This network flashes the Laser Amplifier heads 94 during operation of the laser peening process. The laser control computer 92 generates a signal to trigger the laser head 94 to fire the laser. The digital delay generator 83 receives the trigger signal from the laser control computer 92 and incorporates a predetermined delay into the trigger signal, forming a trigger signal with a delay. Next, the laser pulse forming network charger 82 receives the delayed trigger signal and provides the signal to the laser head 94 to initiate firing of the laser. A robot control or CNC 84 is used to provide the predetermined delay, which can be set or changed, to the digital delay generator 83.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for controlling a power level, the system comprising:
a laser apparatus comprising a first circuit having a first impedance and a second circuit having a second impedance;
the first circuit being configured to generate a first output power level in the laser apparatus;
a switching device configured and disposed to connect and disconnect the second circuit in series with the first circuit, wherein the switching device connects the second circuit to the first circuit in a finite time that is less than one second and disconnects the second circuit from the first circuit in a finite time that is less than one second; and wherein the connection of the second circuit to the first circuit generates a second output power level from the laser apparatus.

2. The system of claim 1 wherein the switching device comprises a first control relay and a second control relay, the first control relay being connected in series with the second impedance and the second control relay being connected in parallel with the second impedance.

3. The system of claim 2 wherein the first control relay is a normally open control relay and the second control relay is a normally closed control relay.

4. The system of claim 1 wherein the switching device is configured to connect the second circuit in parallel with the first circuit.

5. The system of claim 4 wherein the switching device comprises a control relay, the control relay being connected in series with the second impedance.

6. The system of claim 5 wherein the control relay is a normally closed control relay.

7. The system of claim 1 wherein the first impedance is a first resistance and the second impedance is a second resistance.

8. The system of claim 7 wherein:
the first output power level is greater than the second output power level in response to the second circuit being connected in series with the first circuit; and
the first output power level is less than the second output power level in response to the second circuit being connected in parallel to the first circuit.

9. The system of claim 1:
wherein the switching device is configured and disposed to connect and disconnect an at least one additional circuit from the second circuit, wherein the at least one additional circuit comprises an additional impedance;
wherein the switching device connects the at least one additional circuit to the second circuit in a finite time that is less than one second and disconnects the at least one additional circuit from the second circuit in a finite time that is less than one second; and
wherein the connection of the at least one additional circuit to the second circuit generates an additional output power level from the laser apparatus.

10. A system for controlling a power level in a laser head of a laser apparatus used with a laser shock peening process, the system comprising:
a laser control computer, the laser control computer being configured to generate a signal to trigger the laser head;
a digital delay generator, the digital delay generator being configured to receive the trigger signal from the laser control computer, the digital delay generator being configured to incorporate a predetermined delay into the trigger signal to generate a delayed trigger signal;
a laser pulse forming network charger, the laser pulse forming network charger being configured to receive and provide a firing signal to the laser head to initiate operation of the laser head;
a control arrangement, the control arrangement being configured to provide the predetermined delay to the digital delay generator; and
wherein the predetermined delay being used to control an output power level of the laser head.

11. The system of claim 10, wherein the control arrangement is configured to receive a user input relating to the predetermined delay.

12. A method for controlling a laser apparatus in a laser shock peening process, the method comprising the steps of:
providing a laser apparatus configured to perform a laser shock peening process, the laser apparatus having a first circuit with a first impedance, and the first circuit being configured to provide a first energy level;
connecting a second circuit to the first circuit, the second circuit comprising a second impedance and a switching arrangement, the switching arrangement being configured to connect the second impedance to the first circuit to provide a second energy level or to isolate the second impedance from the first circuit;
controlling the switching arrangement to isolate the second impedance, wherein the switching arrangement isolates the second impedance in less than one second;
operating the laser apparatus at the first energy level in response to the second impedance being isolated by the switching arrangement;
controlling the switching arrangement to connect the second impedance, wherein the switching arrangement connects the second impedance in less than one second; and
operating the laser apparatus at the second energy level in response to the second impedance being connected.

13. The method of claim 12 further comprising the step of connecting an additional circuit to the first circuit, the additional circuit comprising an additional impedance and an additional switching arrangement, the additional switching arrangement being configured to connect the additional impedance to the first circuit to provide an additional energy level or to isolate the additional impedance from the first circuit.

14. The method of claim 12 further comprising the step of switching between the first energy level and the second energy level a plurality of times during a laser shock peening process.

15. The method of claim 14 wherein the step of switching between the first energy level and the second energy level includes:
repeating the steps of controlling the switching arrangement to isolate the second impedance and operating the laser apparatus at the first energy level to switch to the first energy level; and
repeating the steps of controlling the switching arrangement to connect the second impedance and operating the laser apparatus at the second energy level to switch to the second energy level.

16. The method of claim 15 wherein the switching arrangement connects the second impedance in parallel with the first impedance.

17. The method of claim 15 wherein the switching arrangement connects the second impedance in series with the first impedance.

18. The method of claim 17 wherein the switching arrangement comprises a first switching device and a second switching device and the step of switching between the first energy level and the second energy level includes controlling operation of the first switching device and the second switching device to avoid an open circuit condition.

* * * * *